United States Patent [19]
Newell

[11] 3,940,188
[45] Feb. 24, 1976

[54] BEARING HOUSING ADAPTABLE TO REWORKED SHAFT BY REVERSAL

[75] Inventor: Robert Keith Newell, Cedar Rapids, Iowa

[73] Assignee: Pettibone Corporation, Chicago, Ill.

[22] Filed: May 22, 1974

[21] Appl. No.: 472,303

[52] U.S. Cl. .................. 308/15; 308/35; 308/173
[51] Int. Cl.² ........................................ F16C 13/00
[58] Field of Search ............ 308/15, 22, 27, 35, 37, 308/177, 173, 178, 209, 210, 211, 23 G

[56] References Cited
UNITED STATES PATENTS

| | | | |
|---|---|---|---|
| 3,707,315 | 12/1972 | Goodfellow | 308/15 X |
| 3,851,934 | 12/1974 | Kufner | 308/15 |

Primary Examiner—M. Henson Wood, Jr.
Assistant Examiner—Gene A. Church
Attorney, Agent, or Firm—Darbo, Robertson & Vandenburgh

[57] ABSTRACT

A bearing housing for a heavy rotor is made axially-nonsymmetrical so that the bearing chamber therein is shifted axially of the rotor shaft upon reversing the bearing housing. With a new rotor, the nonsymmetry positions the bearing chamber axially outwardly from the housing center. When necessary, the rotor shaft, by virtue of having successively increased diameters inwardly from its end, can be reworked by turning new surfaces thereon positioned axially inwardly from the original surfaces. The bearing housing is then reversed so that its nonsymmetry locates the bearing chamber inwardly from the housing center, to accommodate the new positions of the shaft surfaces.

5 Claims, 3 Drawing Figures

BEARING HOUSING ADAPTABLE TO REWORKED SHAFT BY REVERSAL

INTRODUCTION

On heavy machinery such as shredders for automobile bodies, replacement of the shafts is an extremely expensive matter. A shaft may need replacement, for example, when the bearing has failed to such an extent that there is rotation between the inner ring of the bearing and the shaft, scoring the shaft. Heretofore, expedients for avoiding replacing the shaft in such situations have included various efforts to apply new metal to the shaft so that it could again be turned or ground down to the original contour, and a new bearing installed in the same location as the previous bearing. Although this procedure is believed to have been successful sometimes, it is also believed to have been sometimes unsatisfactory or even a total failure. In short, it has been unreliable.

According to the present invention, the step of building up the shaft by adding metal to it is avoided, thereby also avoiding the uncertainties of this procedure in the past. The original shaft, without build-up, is reworked by turning or grinding or both to provide new surfaces like the original surfaces except spaced axially inwardly from the original surfaces. This is possible because shafts of this type are always of inwardly increasing diameters (of generally tapering of stepped contour) so that even after bad scoring there is plenty of metal for turning down the shaft to provide new bearing-contoured surfaces if the locations of these surfaces are shifted axially inward, or further away from the end of the shaft.

There is an inherent difficulty attendant upon such shifting of the bearing-contoured surfaces in that the bearing housing has a fixed location. The fact that the shifted bearing-contoured surfaces would not fit the old bearing location has apparently heretofore discouraged all thought of reworking of shafts without build-up. Whether this ultimate nonmatching prevented anyone from thinking of such simple reworking of the shafts or whether they thought of it and were deterred from thinking further by the evident mismatching is not known.

According to the present invention, this difficulty of axial displacement is solved by making the bearing housing axially nonsymmetrical in such a way that by reversing it, the bearing housing is located slightly outwardly of the axial position of the center of the bearing housing. When the shaft has been reworked, the bearing housing is swung 180° so that the same nonsymmetry now locates the bearing chamber slightly inwardly from the axial position of the bearing housing instead of slightly outwardly. It has been found to be possible, for example, to accomplish in this manner an axial bearing shift of 1½ inches, which is enough to permit the reworking of the shaft in the new more inwardly located position.

The advantages of the invention will be more clearly understood with reference to the following description and to the drawings.

DESIGNATION OF FIGURES

INTENT CLAUSE

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

BACKGROUND DESCRIPTION

Figure 3:
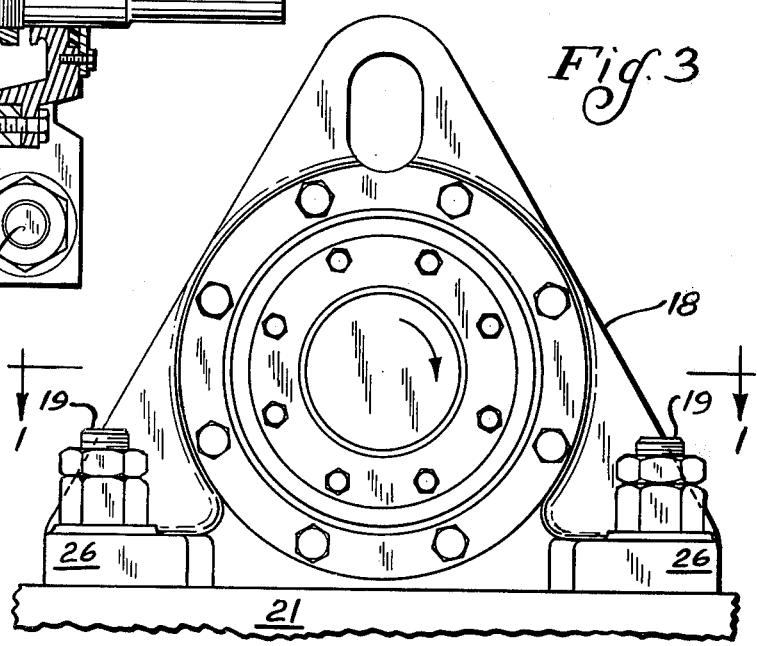
FIG. 3 is an end view of the bearing housing and shaft.

Ignoring, for the moment, the novel features of this invention, the invention is illustrated for rotatively mounting a heavy shaft 11 and includes a self-aligning roller bearing assembly 12. The assembly 12 includes an inner race ring 13 which is internally tapered to fit a tapered portion 14 of shaft 11. The bearing assembly also includes an outer race ring 16 which fits snugly within a housing ring 17. The housing ring 17 is part of a housing 18, seen best in FIG. 3. The housing 18 is firmly secured in place on the machine's bearing sill 21 by bolts 19.

The outer ring 16 is properly positioned within housing ring 17 by an inner cap 22 and an outer cap 23, both of which are bolted to the housing ring 17. The space occupied by ring 17 may be deemed the bearing chamber. The caps 22 and 23 have minute clearance around the shaft 11, resilient seals 24 being provided for retention of lubrication and exclusion of dust.

Thus the weight of the housing 18, and also the great weight of the shaft 11 and its rotor, are carried by base 26. The sill 21 is engaged by the base 26 of housing 18, through which the bolts 19 extend.

DESCRIPTION OF THE PRESENT INVENTION

Figure 1:
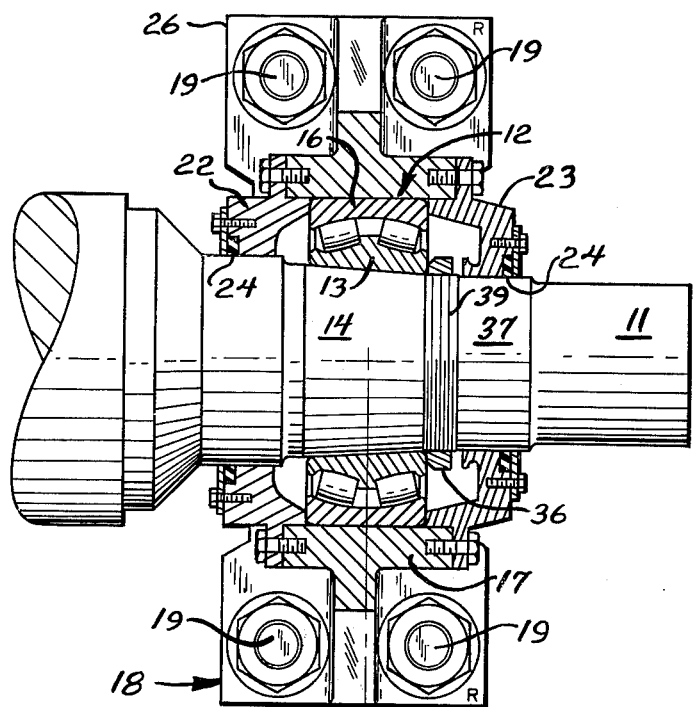
FIG. 1 is a horizontal sectional view through a bearing and its housing, taken approximately along the line 1 — 1 of FIG. 3, and showing a new shaft with the bearing in its original situation.

In a sense, the present invention is made possible by the delightfully simple expedient of designing the one-piece bearing housing 18 with its housing ring 17 located in an axially nonsymmetrical position with respect to the base 26 (and more especially with respect to its positioning formations, the holes in base 26 which snugly receive bolts 19). Thus, as seen in FIG. 1, the axial center of the housing ring 17 is closer to the right-hand bolts 19 than to the left-hand bolts 19. Because of the small scale of the drawings, the amount of this nonsymmetry seems small. However, the actual embodiments of the bearings of the type illustrated have bolts 19 that are 2½ inches in diameter. On that basis the amount of dissymmetry shown corresponds to a ¾ inch displacement from axial center. In other words, the outer ring 16 is displaced ¾ of an inch to the right in FIG. 1 from the position that it would have by its location in the conventional centered or symmetrical position. If the radial plane midway between the right bolts 19 and the left bolts 19 is called the mounting center of housing 18, the center of the bearing chamber is ¾ inch to one side of it, outwardly in a new machine.

Upon reversal of the bearing housing, the bearing chamber will be centered ¾ inch inwardly of the mounting center, a shift of 1½ inches.

Figure 2:
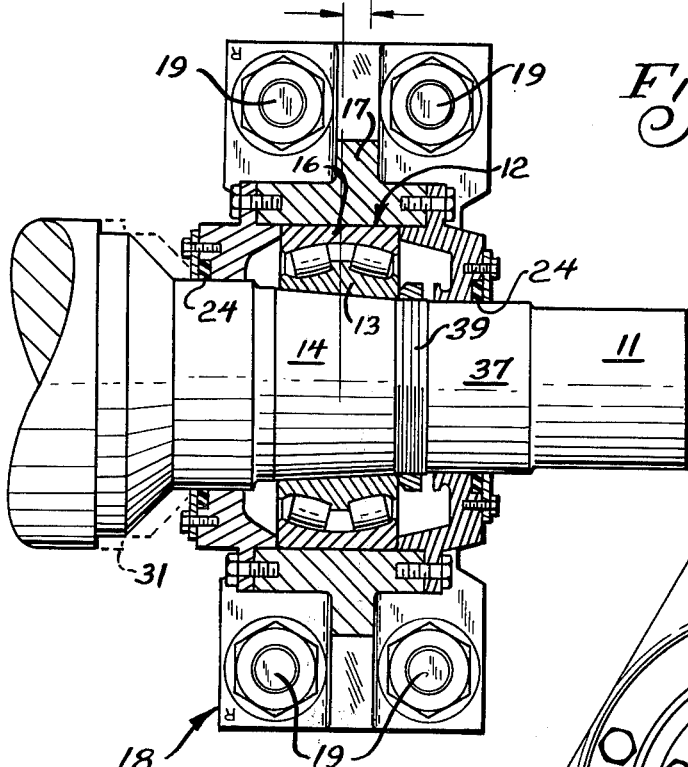
FIG. 2 is a similar view but showing the shaft after reworking, and with the bearing housing reversed and the bearing located further inwardly.

FIG. 2 shows the assembly after reworking of the shaft 11 and reversal of the bearing housing 18. The shaft 11, without any build-up by addition of metal, has been reworked by removal of metal, as by turning or grinding or both. The original contour seen in FIG. 1 is shown in part by broken lines 31, considerable metal having been removed in this area. Within the bearing housing and its caps, the removal is mainly a moderate reduction in diameter of the shaft at particular points to provide the same contours as in FIG. 1 except shifted to the left. It will be observed in FIG. 2 that the axial centers of the outer bearing ring 16 and of the housing ring 17 are now closer to the left-hand bolts 19 than to the right-hand bolts 19. This lateral shift of the bearing and housing parts must, of course, exactly match the leftward axial shift of the bearing-contoured parts of the shaft 11. This matching shift of the bearing and housing parts is accomplished by the delightfully simple expedient of reversing the housing 18. To facilitate recognizing this reversal, letters "R" have been shown at right-hand corners in FIG. 1 as if they had been stamped into the metal. In FIG. 2 these corners stamped with "R" are seen to be at the left, with each "R" upside down. Thus the housing 18 has been swung 180°, as viewed in FIGS. 1 and 2, i.e., from above.

Preferably the other end of shaft 11 also is provided with a similar reversible nonsymmetrical bearing housing. However, only one bearing usually fails, and the other end of the shaft may therefore not need reworking. Of course its bearing may be replaced nevertheless.

It should be understood, of course, that in FIG. 2 the bearing assembly 12 is a replacement assembly, not the one which, when located as shown in FIG. 1, had ultimately failed, causing scoring of the shaft so that it needed the reworking of the shaft to the condition seen in FIG. 2.

One detail which possibly needs to be specifically noted concerns the retaining nut 36 threaded on shaft 11. These threads are cut into a shoulder which, before thread cutting, is substantially the same diameter as the adjacent or smaller end of the tapered portion 14 of the shaft and slightly larger in diameter than the next outward or step portion 37 of the shaft. Inasmuch as the retaining nut 36 must slide freely over the step portion 37, it follows that the threads for nut 36 need not (and should not) be cut as deeply as to the diameter of the step portion 37. Hence in FIG. 2 the step portion 37, which has been extended to the left, will not be indented by the threads which were once in the zone through which step 37 has been extended. In other words, the threads 39 are cut into an annular shoulder the outer diameter of which is no greater than the diameter of the smaller end of the conical portion 14, with the internal diameter of the threads slightly larger than the diameter of the annular step 37.

ACHIEVEMENT

According to the present invention, a shaft which might otherwise need to be replaced is reworked, without rebuilding, i.e. without the addition of metal, to provide new bearing-contoured surfaces like those provided when the shaft was new, except for being relocated far enough inwardly so that the inwardly increased diameters of the shaft provide the necessary new metal for the reworking. The matching axial shift of the bearing housing, and particularly of the bearing chamber therein which is occupied by the outer ring 16, is accomplished merely by reversing or swinging through 180° the nonsymmetrical bearing housing provided according to the present invention.

For new installations (either new mills or newly replaced shafts) the original bearing center will presumably be slightly further out than heretofore. Lengthening the shaft correspondingly may be desirable, but rarely would it be necessary. The cost of the added length, if provided, will be almost negligible compared to possible savings.

With existing shafts it will apparently be possible, if scoring can be cleaned up by a relocation of the bearing-contoured surfaces ¾ inch or so inwardly, to substitute a nonsymmetrical housing of the present invention for an existing symmetrical housing. The dissymmetry could be greater than ¾ inch, a figure chosen to give a safe displacement of relocation when doubled by reversal. Shafts usually have "spare" length between the bearings which would permit the relocation.

Likewise, with a new shaft equipped with an outwardly disposed nonsymmetrical bearing housing of the present invention, if the scoring can be removed by one-half of the relocation-displacement which reversal would permit, a conventional symmetrical housing can be substituted. Then, in the event of another bearing failure and shaft scoring, the shaft can, if the nature of the scoring permits, be saved by a second reworking. This time the nonsymmetrical housing would be restored, with inward disposition of its bearing.

I claim:

1. A bearing housing having positioning formations for cooperating with securing means to predetermine the axial location of a housing-base center along an axis extending through the bearing housing, and structure located with axial nonsymmetry with respect to said formations to provide a bearing chamber the center of which is axially displaced from said base center, said bearing housing being, in part at least, reversible so that the axial displacement of the center of the bearing-receiving chamber will be displaced axially in the opposite direction from the direction of the original displacement, the bearing housing being adapted to receive a shaft end with its diameters increasing in the direction inwardly from the end of the shaft providing shaft dimensions within which the shaft can be reworked to bearing-contours similar to its original bearing-contours but relocated inwardly to match the inward shifting of the center of the bearing-receiving chamber upon reversal of the bearing housing parts.

2. A bearing housing member having positioning formations for cooperating with securing menas to predetermine the axial location of a housing-base center along an axis extending through the bearing housing, and a housing ring having a bearing-receiving chamber therein located with axial nonsymmetry with respect to said formations to be axially displaced from said base center, said bearing housing member being reversible so that the axial displacement of the bearing-receiving chamber will be displaced axially in the opposite direction from the direction of the original displacement, the bearing housing member adapted to receive a shaft end with its diameters increasing in the direction inwardly from the end of the shaft providing shaft dimensions within which the shaft can be reworked to bearing-contours similar to its original bearing-contours but relocated inwardly to match the inward shifting of the center of the bearing-receiving chamber upon reversal of the bearing housing member.

3. The combination of a bearing housing member according to claim 2 and inner and outer caps each of which fits either side of said member so as to still be usable in its same inner or outer position when the member is reversed.

4. A bearing housing according to claim 2 in which the nonsymmetry is of dimensions such that upon reversal the axial displacement will be an amount suitable for proper correlation with the original shaft, positioned as before but with its diameters for bearing and seal engagement moved axially by reworking the end portion of the shaft to the same diameters but axially displaced.

5. The combination of a bearing housing member according to claim 2, a bearing therein, and a shaft rotatably carried by the bearing and engaged by seals in opposite axial directions from the bearing, said shaft having its diameters for bearing and seal engagement increasing inwardly from the end of the shaft and having an accessible portion of larger diameter inwardly of these diameters providing shaft dimensions within which the shaft can be reworked to bearing contours similar to its original bearing-contours but displaced axially inward by an amount equal to the axial displacement of the bearing housing upon being reversed.

* * * * *